UNITED STATES PATENT OFFICE.

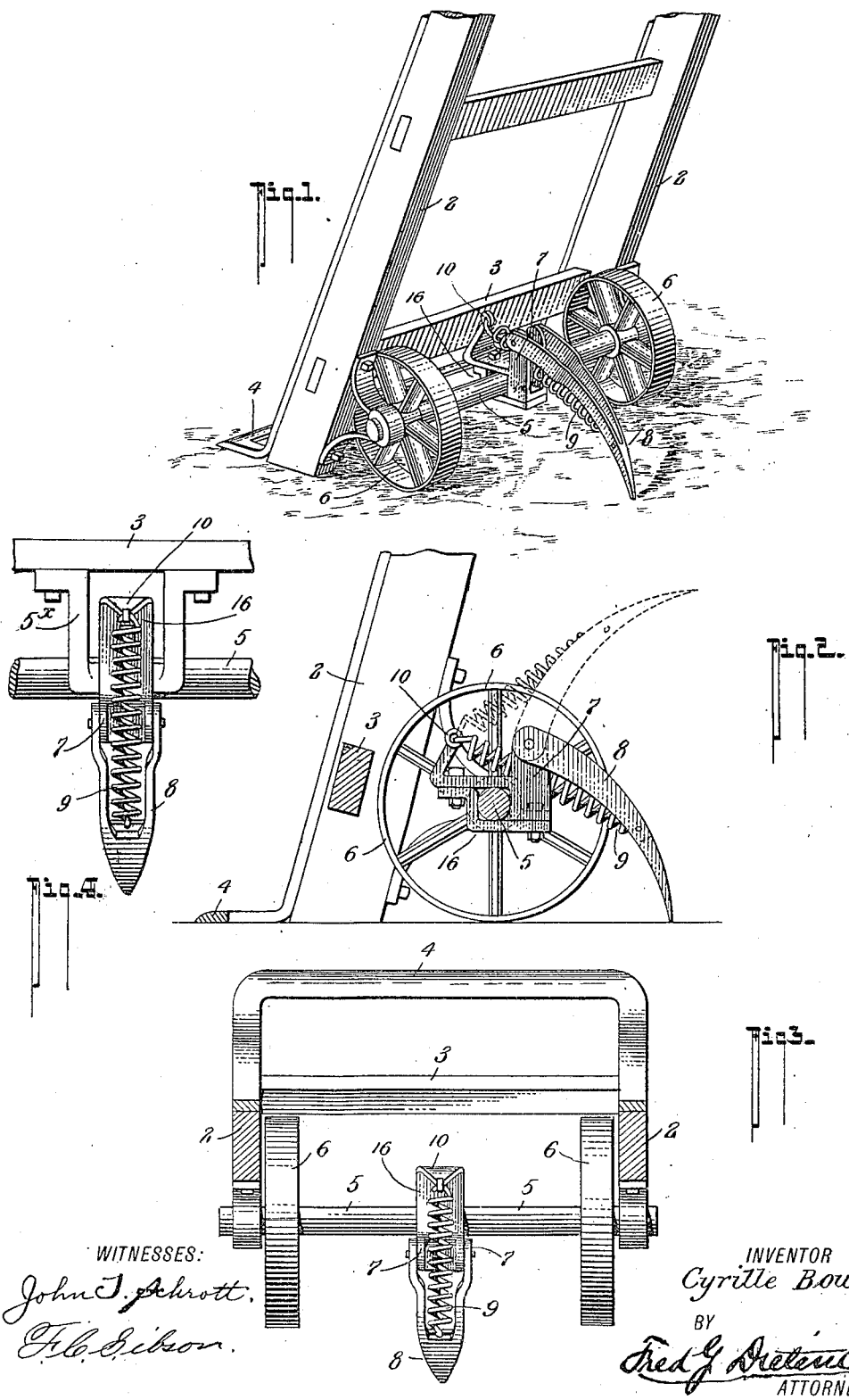

CYRILLE BOURQUE, OF VANCOUVER, BRITISH COLUMBIA, CANADA.

WAREHOUSE-TRUCK-WHEEL CHECK.

No. 831,701.          Specification of Letters Patent.          Patented Sept. 25, 1906.

Application filed September 22, 1905. Serial No. 279,703.

*To all whom it may concern:*

Be it known that I, CYRILLE BOURQUE, a citizen of the Dominion of Canada, residing at the city of Vancouver, in the Province of British Columbia, Canada, have invented a new and useful Improvement in Warehouse-Truck-Wheel Checks, of which the following is a specification.

My invention relates to a check for two-wheeled hand-trucks such as are used in warehouses, and is designed to prevent the truck running back toward the handler while the load is being lifted from the ground.

In using trucks of this class the back or lifting bar is run under the article to be lifted, and while one hand steadies the load with the other the truck is used as a lever to lift the load from the ground for transference as desired, and while this lifting is being performed by the operator pulling the truck-handles toward him the truck will run on its wheels in response to the pressure so applied. To check this tendency, it is customary to place a foot on the axle as the handles are being pulled down, and it is to avoid this necessity and provide a more effectual check that the device which is the subject of this application has been invented.

I provide, therefore, a spike-check pivotally mounted on the axle of the truck, so that it may when desired be thrown into contact with the ground, and the spike is so connected that though affording an effectual check when the truck is in the upright or lifting position when the load is lifted and the handles of the truck are lowered into the hauling or the pushing position the check will automatically spring clear and offer no hindrance to the movement of the truck.

The particular construction of the device and the manner of its application and use are fully described in the following specification and illustrated in the drawings which accompany it.

Figure 1 is a perspective view of my invention in use, parts of the truck being broken away. Fig. 2 is a vertical section through the lower end of a truck, showing the application of the check thereto, the dot-and-dash lines indicating the check in the release position. Fig. 3 is a plan of the check in position on the axle, parts of the truck being broken away. Fig. 4 is a plan view showing a slightly-modified form of attachment.

In the drawings the side frame of the truck is represented by 2, the cross-rails by 3, the end lifting-bar by 4, the axles by 5, and the wheels by 6. Secured by means of bolts on the axle 5, which in trucks of this kind do not rotate, is a clamp 16, having lugs 7, on which is pivotally mounted a spike-check 8, the form of the spike and the position of the clamp on which it is pivoted being such that the point of the spike may be thrown into engagement with the surface of the floor or ground when the truck is in the up-ended position to lift its load.

The spike is preferably made with an open-ended jaw where connected to the lugs 7 of the clamp, and in the space between the jaws is a tension-spring 9, one end of which is connected to the spike between the pivot and the spike end and the other end to an upwardly-projecting member 10, secured to or forming a part of the clamp member 16. In Fig. 4 I have shown a modified form of my invention in which the check is attached to a bracket 5× instead of the wheel-axle direct. The line of pull of this spring is such in relation to the pivot of the spike that when the truck is in the up-ended position, as drawn, the tension of the spring will hold the spike-check either up, as drawn in dot and dash, or when pushed down with the foot over the extreme reach of its arc will hold it firmly in contact with the ground, in which position it will check any tendency to backward movement of the truck on its wheels when the handles are pulled down to lift a load. As the load is lifted, however, and the handles are lowered into the trucking position the spike will be forced over until the end of the spike lies in the same plane with the pivot of the check 8 and slightly farther. As soon as this is done the spring 9 will exert force and draw the spike into the position shown in dotted lines in Fig. 2, as will be clearly understood by reference to the drawings.

In use the truckman runs the back or lifting bar 4 under the load and presses down the spike-check 8 with his foot, when it will spring into contact with the ground and act as a check. Then on lowering the handles to pull the load the check automatically springs clear, and the truck is free to be moved away.

The device is simple and cheap in construction, is not liable to derangement, and can be applied to any truck of this class without change of existing parts, to facilitate which general application the clamp members are made with a square grip-contact that can be applied to either a round or square axle.

I do not desire to be confined to the particular details of construction here revealed, as it will be obvious that with a slight modification in the manner of application the same result may be obtained by a compression instead of a tension spring, or the tension-spring, or, in fact, the whole device, may be connected to the frame of the truck, as the axle not being rotatable is virtually a part of such frame; but I prefer the construction shown as being more readily attachable to existing trucks or removable therefrom when desired.

Having now particularly described the nature of my invention and the manner of its operation, I declare that what I claim as new, and desire to be protected in by Letters Patent, is—

1. In a device of the class described, the combination with a wheel-truck including an axle, of a clamp secured to said axle, a spike member pivotally connected to said clamp, a spring secured to said spike and said clamp to hold the spike in contact with the ground when the truck is in an up-ended position and to automatically effect the release of the spike from such contact when the handles are lowered, substantially as shown and described.

2. A device of the class described, comprising in combination with a wheel-truck, a bracket member, means for clamping said bracket member to said truck, said bracket member having a heel portion, a spike pivotally secured to said bracket member, a spring secured to said heel member and said spike to hold the spike in engagement with the ground at times and to release said spike from such ground-engaging position when the handles of the truck are lowered, substantially as shown and described.

3. A check for warehouse-trucks, comprising in combination with a clamp member securable to the axle of a truck, said clamp member having a bracket portion, a spike pivotally secured to said bracket portion, means coöperatively connected with the clamp and the spike for holding the spike in contact with the ground at times and for automatically releasing the spike from the ground when the truck is in a predetermined position, substantially as shown and described.

4. A device of the class described, comprising a clamp member clampable to the axle of a wheel-truck, said clamp member having a heel portion and a bifurcated portion, a spike having a bifurcated end pivotally secured to the bifurcated portion of the clamp, a spring pivotally secured to the heel of the clamp and to the spike between the bifurcated end of the spike and the bifurcated bracket, substantially as shown and for the purposes described.

5. In a device of the class described; the combination with the axle of the truck-wheels, of a clamp member in two halves secured by bolts to the axle, lugs upwardly-projecting from one of the clamp members, a spike member having an open jaw by which it may be pivotally connected to the lugs, a tension-spring between the jaws of the spike one end of which spring is secured to the spike member and the other end to the clamp member.

6. In a device of the class described; the combination with the axle of the truck-wheels, of a clamp secured to the same by bolts and having a square clamping-surface where it embraces the axle, upwardly-projecting lugs on the rearward portion of the upper clamp member, a downwardly-curved spike member having an open jaw where pivotally connected to the lugs of the clamp member, a tension-spring between the jaws of the spike member one end of which is connected to that member and the other to a standard upwardly projecting from the upper clamp member.

In testimony whereof I have signed my name to this specification in the presence of two subscribing witnesses.

CYRILLE BOURQUE.

Witnesses:
 J. A. KENNING,
 ROWLAND BRITTAIN.